US011894795B2

(12) United States Patent
Mahankali et al.

(10) Patent No.: US 11,894,795 B2
(45) Date of Patent: Feb. 6, 2024

(54) INDUCTANCE-BASED, HIGH-TORQUE START UP OF ELECTRIC MOTOR

(71) Applicant: TEXAS INSTRUMENTS INCORPORATED, Dallas, TX (US)

(72) Inventors: Venkata Pavan Mahankali, Bangalore (IN); Prasad Kulkarni, Bangalore (IN); Ganapathi Hegde, Bangalore (IN); Sameer Kulkarni, Pune (IN)

(73) Assignee: Texas Instruments Incorporated, Dallas, TX (US)

( * ) Notice: Subject to any disclaimer, the term of this patent is extended or adjusted under 35 U.S.C. 154(b) by 84 days.

(21) Appl. No.: 17/731,389

(22) Filed: Apr. 28, 2022

(65) Prior Publication Data

US 2023/0353072 A1 Nov. 2, 2023

(51) Int. Cl.
*H02P 6/185* (2016.01)
*H02P 6/21* (2016.01)
*H02P 6/18* (2016.01)

(52) U.S. Cl.
CPC ............... *H02P 6/21* (2016.02); *H02P 6/186* (2013.01)

(58) Field of Classification Search
CPC ................................... H02P 6/21; H02P 6/186
See application file for complete search history.

(56) References Cited

U.S. PATENT DOCUMENTS

| 6,650,082 B1* | 11/2003 | Du | H02P 6/20 |
| | | | 318/701 |
| 2013/0234531 A1* | 9/2013 | Budgett | H04B 5/0037 |
| | | | 307/104 |
| 2016/0294311 A1* | 10/2016 | Lu | H02P 6/185 |
| 2019/0020292 A1* | 1/2019 | Lu | H02P 6/181 |
| 2020/0195177 A1* | 6/2020 | Boscolo Berto | H02P 6/185 |

\* cited by examiner

*Primary Examiner* — Muhammad S Islam
(74) *Attorney, Agent, or Firm* — Valerie M. Davis; Frank D. Cimino

(57) ABSTRACT

Example systems and processes use three-phase vector mutual inductance analysis to detect zero-crossing (ZC) locations of back-electromotive force (BEMF) of an electric motor and to detect its commutation points during start-up or low-speed operation. For each sector of rotation of the rotor, two pairs of three-phase vectors are applied, along with current for the corresponding driving phase. The first pair is alternately applied to move the rotor, and the mutual inductances resulting from such application are compared to detect the zero-crossing (ZC) location in the BEMF of the electric motor in that sector. The second pair is then alternately applied within the same sector to continue to move the rotor, and the mutual inductances from such application are compared to detect the commutation point of the electric motor in that sector. The process may be repeated for each successive sector, changing the driving current at each new sector.

19 Claims, 11 Drawing Sheets

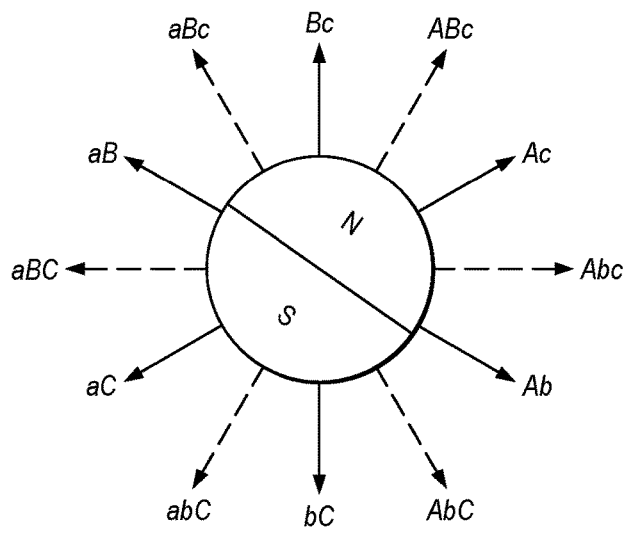

FIG. 5A

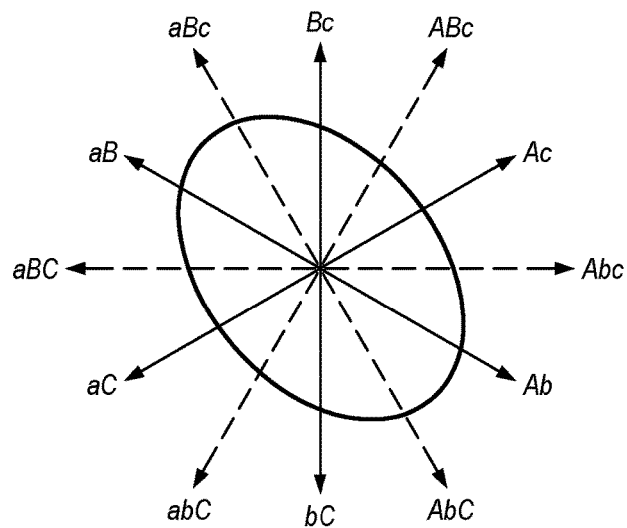

FIG. 5B $$L_{ss} = \begin{bmatrix} L_{aa} & M_{ab} & M_{ac} \\ M_{ba} & L_{bb} & M_{bc} \\ M_{ca} & M_{cb} & L_{cc} \end{bmatrix}$$

FIG. 5C $$\begin{bmatrix} L_{g0} + L_{g2}\cos(2\theta_r) & -\frac{1}{2}L_{g0} + L_{g2}\cos\left(2\theta_r - \frac{2\pi}{3}\right) & -\frac{1}{2}L_{g0} + L_{g2}\cos\left(2\theta_r + \frac{2\pi}{3}\right) \\ -\frac{1}{2}L_{g0} + L_{g2}\cos\left(2\theta_r - \frac{2\pi}{3}\right) & L_{g0} + L_{g2}\cos\left(2\theta_r + \frac{2\pi}{3}\right) & -\frac{1}{2}L_{g0} + L_{g2}\cos(2\theta_r) \\ -\frac{1}{2}L_{g0} + L_{g2}\cos\left(2\theta_r + \frac{2\pi}{3}\right) & -\frac{1}{2}L_{g0} + L_{g2}\cos(2\theta_r) & L_{g0} + L_{g2}\cos\left(2\theta_r - \frac{2\pi}{3}\right) \end{bmatrix}$$

FIG. 5D

| ACTUAL ROTOR ANGLE | APPLIED TRAP VECTOR | NEW VECTORS FOR MI BASED POSITION DETECTION | DETECTED ANGLE | ZC/ COMMUTATION POINT |
|---|---|---|---|---|
| 30° - 60° | aB | aBc - aBC | 60° | ZC |
| 60° - 90° | aB | aBc - abC | 90° | COMMUTATION |
| 90° - 120° | aC | aBC - abC | 120° | ZC |
| 120° - 150° | aC | aBC - AbC | 150° | COMMUTATION |
| 150° - 180° | bC | abC - AbC | 180° | ZC |
| 180° - 210° | bC | abC - Abc | 210° | COMMUTATION |
| 210° - 240° | Ab | AbC - Abc | 240° | ZC |
| 240° - 270° | Ab | AbC - ABc | 270° | COMMUTATION |
| 270° - 300° | Ac | Abc - Abc | 300° | ZC |
| 300° - 330° | Ac | Abc - aBc | 330° | COMMUTATION |
| 330° - 360° | Bc | Abc - aBc | 360° | ZC |
| 0° - 30° | Bc | Abc - aBC | 30° | COMMUTATION |

FIG. 9A

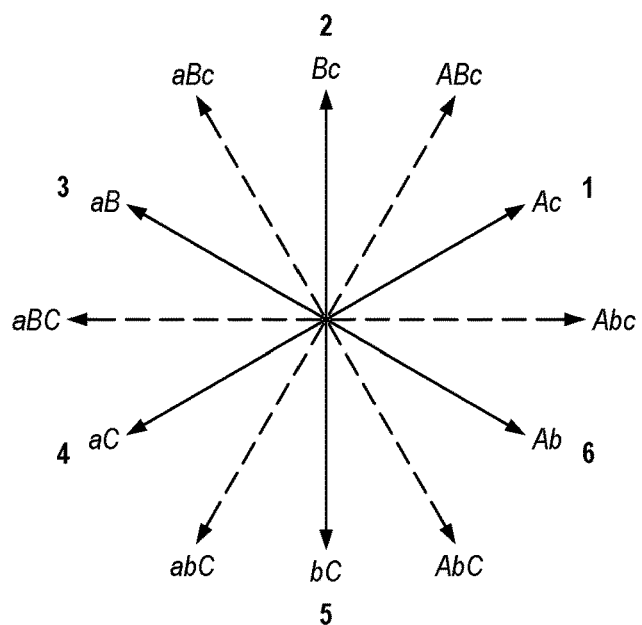

FIG. 9B

INDUCTANCE-BASED, HIGH-TORQUE START UP OF ELECTRIC MOTOR

FIELD OF DISCLOSURE

This disclosure relates generally to inductance-based techniques for generating high-torque at low speeds in an electric motor, and more particularly to using variance of inductance with rotor position to determine rotor position and related parameters at low speeds.

BACKGROUND

Brushless, direct current (BLDC) electric motors are widely used in multiple industrial and commercial settings, including in the automotive market, because of their high-power density and lower maintenance. There are no brushes to maintain or sensors to replace.

Conventionally, a sensorless BLDC electric motor initially begins operation in a start-up mode (e.g., an open-loop mode) in which the motor is forcibly commutated using a velocity profile, during which the motor's stator generates a rotating magnetic field that begins to rotate the motor's rotor at low speeds. Once the rotor attains a sufficient speed, operation switches from the start-up (open-loop) mode to a run mode, e.g., a closed-loop mode.

During start-up of a conventional sensor-less BLDC electric motor, sufficient back-electromotive force (BEMF) is built up, and rotor position (angle) is tracked as it spins using BEMF. For accurate and reliable operation, the motor should be allowed to build up sufficient BEMF as quickly as possible, and the phase of the applied voltage should be synchronized with BEMF based on the load profile before switching to run or closed-loop operation. Open-loop parameters may be tuned during the start-up process. The hand-off from open-loop to closed-loop operation is to occur when the BEMF is sufficient to track rotor position in closed-loop operation. However, in this process, the blind, forced commutation during open-loop operation sometimes results in the motor phase currents not being aligned with BEMF, thus yielding lower performance, e.g., lower start-up torque. Also, tuning the open-loop parameters can be cumbersome, and the parameters may be different for different start-up loads.

These problems are particularly significant in applications, such as power tools and electric-bikes (E-bikes), that require very high and reliable starting torque. In such applications, it is important to track the rotor position from zero speed. As these very high starting torque applications expand, the demand for a sensor-less BLDC motor solution that can provide very high torque from the start of the motor likewise increases. In this context, aspects of the disclosure arise.

SUMMARY

In an example, a process of operating an electric motor comprises alternately applying first and second three-phase vectors (e.g., aBc-aBC) to move a rotor of the electric motor from a first position (e.g., 30°); and delivering a current in a driving phase (e.g., aB) of the electric motor. The first three-phase vector is a first angular degree from the first position of the rotor, and the second three-phase vector is a second angular degree from the first position of the rotor. The process further comprises comparing mutual inductances resulting from application of the first and second three-phase vectors as the rotor moves from the first position; and detecting a zero-crossing (ZC) location in back-electromotive force (BEMF) of the electric motor based on the comparing of the mutual inductances of the first and second three-phase vectors.

In an example, a process of operating an electric motor comprises alternately applying a first set of three-phase vectors (e.g., aBc-aBC) for a first driving phase (e.g., aB) to detect a first zero-crossing (ZC) location in back-electromotive force (BEMF) of the electric motor in a first angular sector (e.g., 30°-60°) of a rotor of the electric motor; and alternately applying a second set of three-phase vectors (e.g., aBc-abC) for the first driving phase to detect a first commutation point of the electric motor in the first angular sector.

In an example, a system comprises an electric motor having a rotor; a driver configured to apply two three-phase vectors to the electric motor and supply driving phase current; measurement logic configured to measure mutual inductances resulting from application of the applied two three-phase vectors; detection logic coupled to the measurement logic and configured to detect a zero-crossing (ZC) location in back-electromotive force (BEMF) of the electric motor based on a comparison of the measured mutual inductances of the two applied three-phase vectors; and control logic coupled to the detection logic and configured to control the driver based on information received from the detection logic.

These and other features will be better understood from the following detailed description with reference to the accompanying drawings.

BRIEF DESCRIPTION OF THE DRAWINGS

Features of the disclosure may be understood from the following figures taken in conjunction with the detailed description.

FIGS. 5A, 5B, 5C and 5D show a three-phase permanent magnet synchronous motor (PMSM) inductance model.

FIG. 9A is a table showing the driving vector and three-phase vector pairs for each 30° sector, along with the detected rotor angle and what it represents.

FIG. 9B is a diagram showing the two- and three-phase vectors along the rotation and six (6) sectors of a complete rotation.

The same reference numbers and other reference designators are used in the drawings to designate the same or similar (structurally and/or functionally) features.

DETAILED DESCRIPTION

Figure 1:
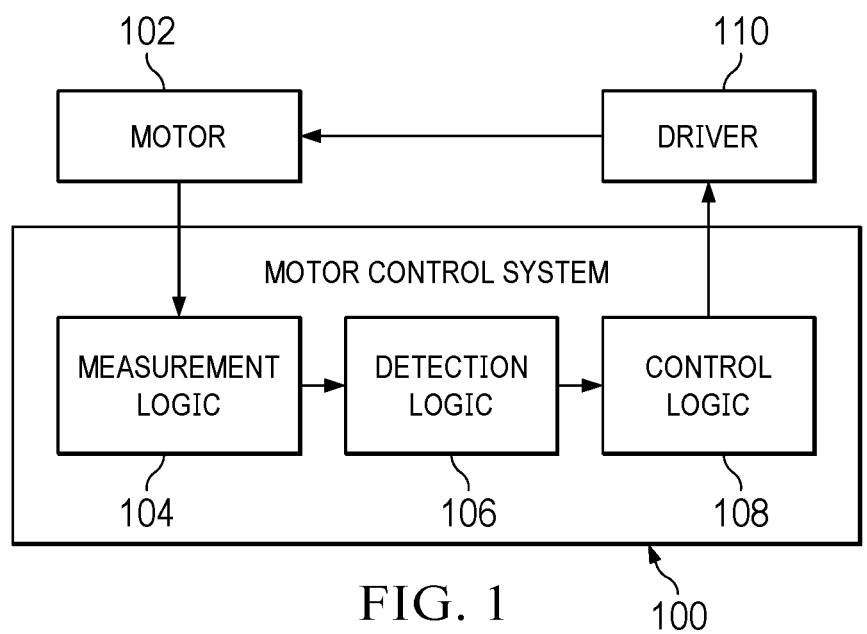
FIG. 1 is a block diagram illustrating an example motor control system to control an electric motor.

Specific examples are described below in detail with reference to the accompanying figures. These examples are not intended to be limiting. The objects depicted in the drawings are not necessarily drawn to scale.

In example arrangements, during start-up or low-speed operation of an electric motor, e.g., during low-speed, open-loop operation of the motor, a three-phase inductance-based technique is implemented to drive the motor and to accurately detect ZC locations and commutation points to yield better start-up/low-speed performance. Motor saliency (variance of inductance with rotor position) is used to determine rotor position at lower speeds. Motor phase currents are aligned with BEMF, leading to higher efficiency during start-up and at lower speeds. Driving current, which is supplied for the driving phase along with pairs of three-phase vectors, is not reduced to zero to provide higher torque at low speeds. Example arrangements provide performance characteristics equivalent to sensor-based electric motor systems but without the added cost and maintenance requirements.

FIG. 1 illustrates an example of a motor control system 100 configured to control a motor 102, which may be an electric, three-phase, BLDC motor. System 100 includes logic (e.g., implemented in a motor controller) that is configured to receive feedback from motor 102 and control operation of motor 102, via a driver 110, based on the feedback.

In some examples, some or all of the logic may be fabricated as part of a motor controller implemented on a common substrate, e.g., integrated in a common chip or die. For example, system 100 and its logic blocks may be implemented as hardware on a silicon chip, in an integrated circuit, in a field-programmable gate-array (FPGA), and/or with discreet logic devices. More generally, the functionality of system 100 may be implemented in any of a variety of ways consistent with the teachings herein.

Figure 2:
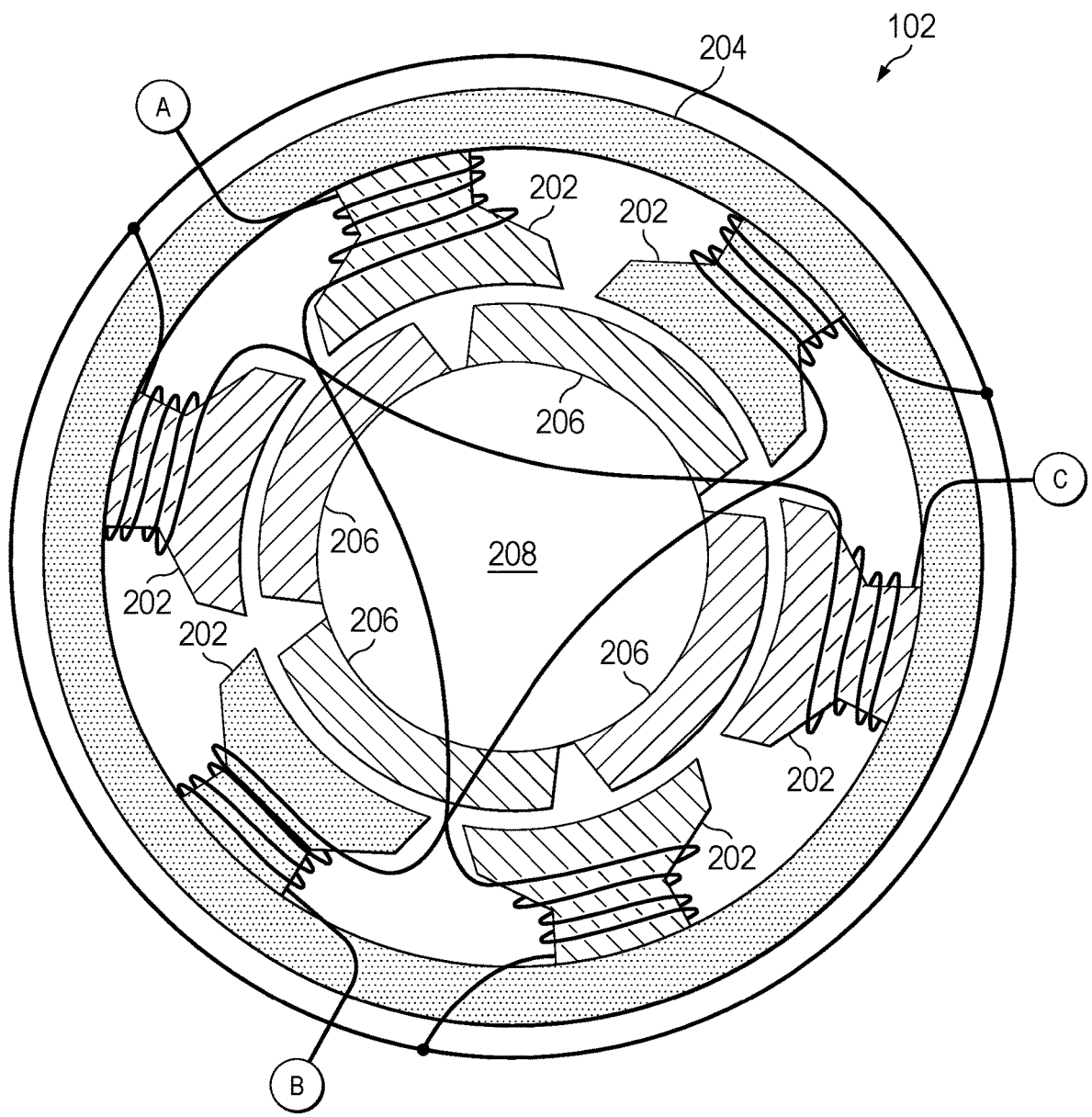
FIG. 2 is a diagram of an example BLDC electric motor.

As shown in FIG. 2, electric motor 102 may include non-permanent electromagnetically activated magnets (electromagnets) 202 mounted in the motor's stator 204. Permanent magnets 206 are mounted to rotor 208 which is positioned centrally to stator 204. In the illustrated example of FIG. 2, electromagnets 202 of stator 204 may be activated with six commutation states that work in pairs to generate the phase voltages and phase currents to rotate rotor 208. The control techniques described herein are not limited to any specific electric motor configuration; rather, such control techniques may be applied to other electric motor arrangements, i.e., having different numbers of permanent magnets and electromagnets than that shown in FIG. 2.

Returning to FIG. 1, example system 100 includes measurement logic 104, detection logic 106, and control logic 108. Control logic 108 is coupled to driver 110 that is configured to apply pairs of three-phase vectors and supply driving phase current to phase windings of motor 102 in response to control signals provided by control logic 108. In an example, two pairs or sets of three-phase vectors are applied in each driving phase, in addition to electric current for each driving phase.

In an example, measurement logic 104 is configured to measure mutual inductances of each pair of three-phase vectors applied to motor 102. Thus, measurement logic 104 may include sampling circuitry to receive and/or sample phase voltages and currents of motor 102, voltage and current measurement circuitry to determine voltages and currents of the samples, and circuitry to determine phase differences between the voltage and current, as well as to measure mutual inductances. Measurement logic 104 is not limited to any particular configuration. Any circuitry suitable to measure inductances in accordance with the teachings herein may be used. The mutual inductance measurements made by measurement logic 104 are provided to detection logic 106 for further processing.

Detection logic 106 receives the mutual inductance measurements from measurement logic 104, e.g., during start-up or low-speed operation of motor 102. Detection logic 106 is configured to detect zero-crossing (ZC) locations of the BEMF voltage and to detect commutation points based on the respective pairs of mutual inductance measurements. That is, in a given rotational sector (e.g., 30-90 electrical degrees) the mutual inductances resulting from application of a first pair or set of three-phase vectors are used to detect or determine a ZC location in that sector, and the mutual inductances resulting from application of a second pair or set of three-phase vectors are used to detect a commutation point in that sector.

The ZC location and commutation point for each sector are provided as they are determined to control logic 108. Initially, control logic 108 controls driver 110 to apply a first pair of three-phase vectors, as well as to supply current for the initial driving phase, based on an initial position of rotor 208. As rotor 208 moves to the ZC location for that sector, determined by comparison of the mutual inductances of the first pair of three-phase vectors, based on the new position of rotor 208, control logic 108 controls driver 110 to apply a second pair of three-phase vectors and to continue to supply current for the initial driving phase. From the mutual inductance s of the second pair of three-phase vectors, the commutation point for that sector is detected. This process of applying first and second pairs of three-phase vectors, the first to detect the ZC location and the second to detect the commutation point for successive sectors continues sector-by-sector as rotor 208 continues to rotate, with control logic 108 supplying driver 110 with control signals as to which pair of three-phase vectors to apply next and when to change the driving current vector.

Figure 3:
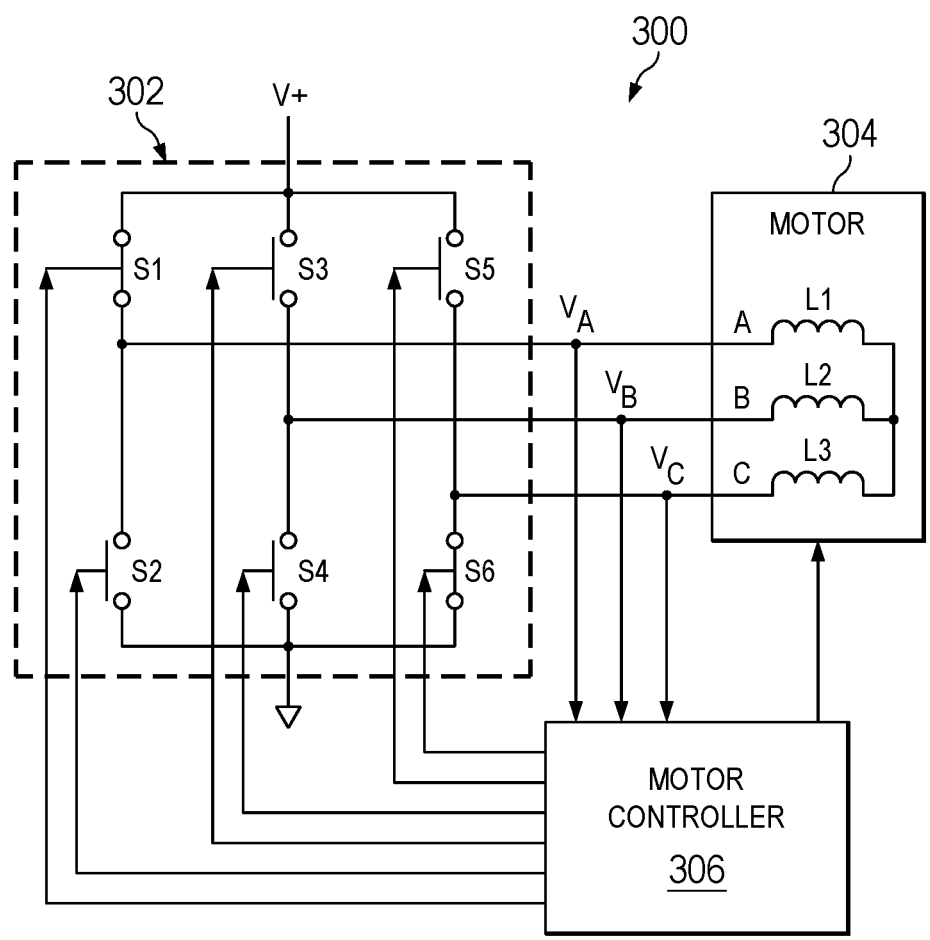
FIG. 3 is a block and schematic diagram of an example electric motor system.

FIG. 3 illustrates an example of a motor system 300 that includes a driver 302 coupled to a motor 304, which is represented as an electric three-phase motor having phase windings A, B and C. In the example of FIG. 3, phase windings A, B and C have inductances shown as L1, L2 and L3, respectively. As an example, motor 304 may have the configuration shown in FIG. 2. In the illustrated example of FIG. 2, electromagnets 202 of stator 204 may be activated with six commutation states that work in pairs to generate the phase voltages to rotate rotor 208.

Driver 302 may include an arrangement (e.g., H-bridge) of switch devices S1, S2, S3, S4, S5 and S6 (e.g., transistors). A motor controller 306 (e.g., corresponding to motor control system 100 of FIG. 1) is coupled to control the switches of driver 302 to generate output phase voltages $V_A$, $V_B$, and $V_C$ which are generally out-of-phase from each other. In the illustrated example, there are three upper switches S1, S3 and S5 connected to a high voltage supply V+ and three lower switches S2, S4 and S6 connected to a low (e.g., ground) voltage. The upper switches S1, S3 and S5 and the lower switches S2, S4 and S6 work in conjunction to supply phase current to the phase windings, which generate corresponding phase voltages $V_A$, $V_B$, and $V_C$.

As disclosed herein, motor controller 306 is configured to control start-up and/or low-speed operation of motor 304 to deliver high torque using an inductance-based technique involving three-phase vectors. To that end, motor controller 306 may include the functionality of measurement logic 104, detection logic 106 and control logic 108. Based on these operations, motor controller 306 may supply control signals to switches S1-S6 in a prescribed order to generate the three phase voltages ($V_A$, $V_B$ and $V_C$) to power electromagnets 202 in stator 204 to effect desired movement of rotor 208.

Figure 4:
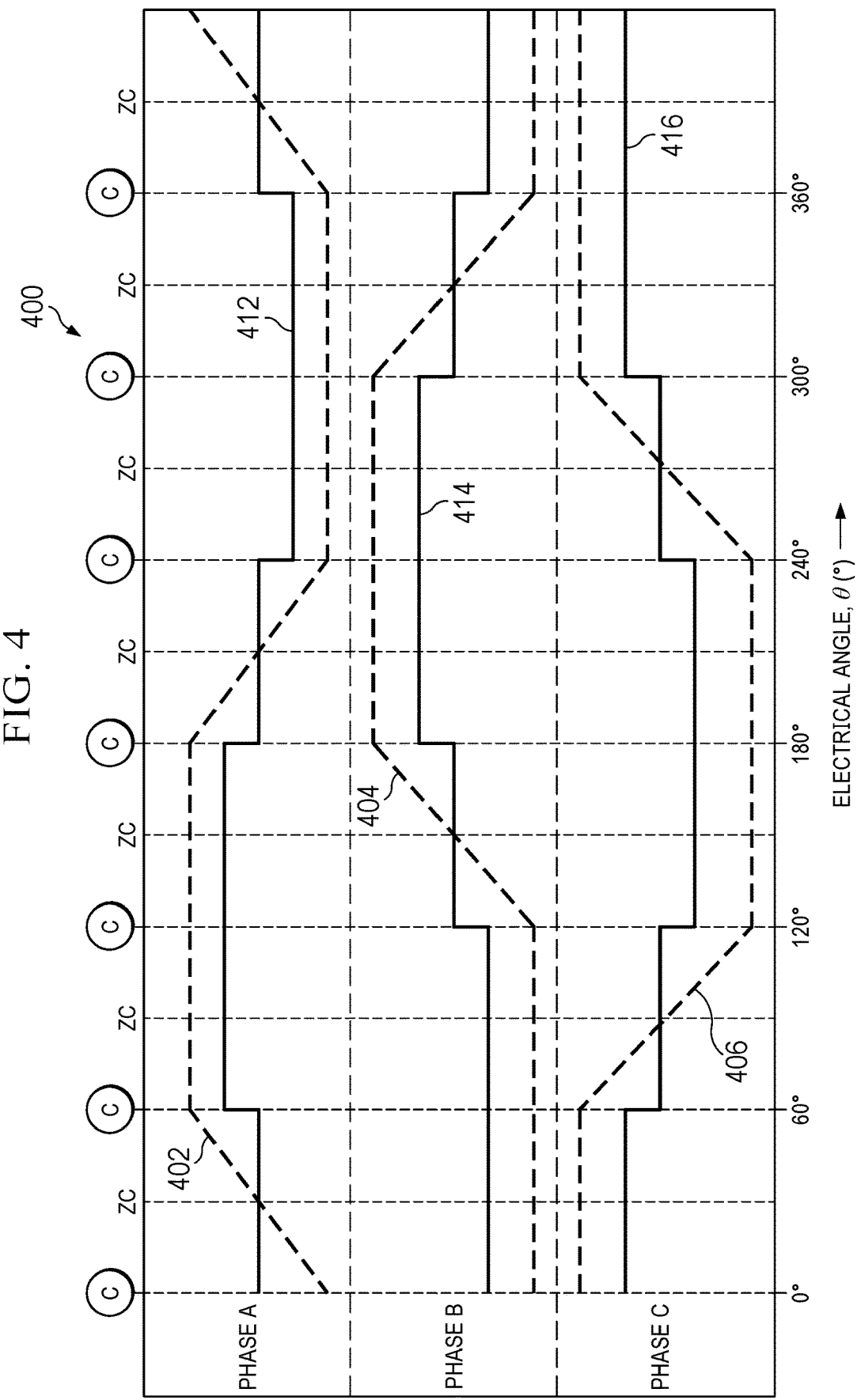
FIG. 4 is a graph of example waveforms of trapezoidal commutation in an example BLDC motor.

FIG. 4 is a graph 400 illustrating exemplary phase voltage waveforms and phase current waveforms with respect to electrical angle, Θ, in electrical degrees of a three-phase BLDC electric motor under conventional trapezoidal control with a single two-phase driving vector and operated based on commutation points and zero-crossing (ZC) points for maximum torque at medium to high speeds. The voltage waveforms for phases A, B and C are denoted by dashed lines 402, 404 and 406, and the current waveforms for phases A, B and C are denoted by solid lines 412, 414 and 416. Commutation points occur at an interval of 60 electrical degrees. Each commutation point is indicated by ©. Each phase voltage has floating phases (ramp up or down) and a conducting phase (relatively steady voltage) for each electrical cycle, one of which is shown in FIG. 4. The BEMF voltages cross a set voltage (e.g., mid-point voltage) of a ramp up or down segment. Each such crossing point represents a BEMF ZC location. Each commutation point occurs approximately 30 electrical degrees from the previous BEMF ZC location.

In conventional trapezoidal commutation, stator 204 is excited with voltages across two phase terminals while the other phase is floated, as shown in FIG. 4. Every commutation point (indicated by © in FIG. 4), the phase voltages are applied to the next set of two-phase vectors. Accuracy of commutation points determines the average torque delivered by motor 102/304.

FIGS. 5A, 5B, 5C and FIG. 5D show a three-phase permanent magnet synchronous motor (PMSM) inductance model, which may be applied to BLDC electric motors. FIG. 5A shows rotor positions, in which the two-phase rotor positions are denoted by solid arrows that are 60° apart. FIG. 5B shows inductance variation. The variation of inductance for a given rotor position across the different phases can be obtained by a motor inductance matrix, such as that shown in FIG. 5C.

The terms of the motor inductance matrix of FIG. 5C may be expanded to as shown in the motor inductance matrix of FIG. 5D. For electric motors with saliency (variance of inductance with rotor position), $L_d \neq L_q$ and $L_{g2} \neq 0$, where $L_d = 3/2(L_{g0} + L_{g2})$ and $L_q = 3/2(L_{g0} - L_{g2})$, and rotor angle information is embedded in the inductance matrix. Thus, dynamically sensing mutual inductance variation for the excited phases can provide accurate rotor position.

While rotor position may be detected by exciting two-phase vectors, in which the driving phase and next-to-driven phase are applied alternately. The mutual inductances of these two phases can be compared, and when the two mutual inductance values cross over, the phases are switched to the next commutation. For example, if the rotor is at an angle of 30°, i.e., position Ac on the rotor position diagram, driving vector aB is excited to extract maximum torque; to determine the commutation point, the next driving vector aC is applied for a short duration. By comparing the mutual inductances of these two vectors continuously for a period of time, the next commutation point can be determined. A problem with this approach is that, in comparing mutual inductances of the present driving vector aB and the next driving vector aC, the current in aB is periodically made to go to zero for exciting vector aC. This pulsating current in driving phase aB leads to loss in average torque, as well as torque ripple leading to decreased acoustic performance. This loss of torque impacts start-up and low-speed operation reliability under certain load conditions.

A better approach, as described herein, is to drive an electric motor using a two-phase driving vector, as well as using three-phase vectors and comparing their mutual inductances to detect ZC locations and commutation points, and thus extract rotor position over the entire speed range (i.e., from zero to full speed). Three-phase comparison vectors are driven along with driving vectors commutated to generate maximum torque. In doing so, the driving vector current is not forced to zero, resulting in availability of full driving torque even at start-up and low-speed operation.

Figure 6:
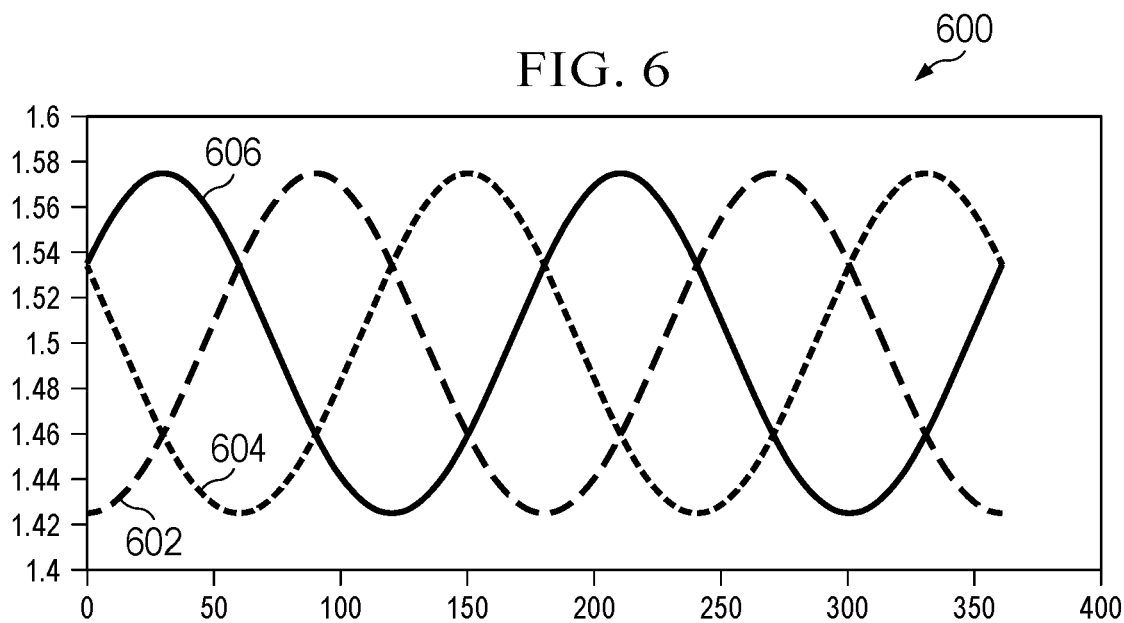
FIG. 6 is a graph showing mutual inductances with respect to rotor angle resulting from application of different three-phase vectors to an electric motor.

FIG. 6 is graph 600 showing inductances ($L_{eq}$) for each of three excited three-phase vectors, i.e., $L_{eqAbc}$, $L_{egABc}$ and $L_{eqAbC}$, with respect to rotor angle, where the last three letters denote the three-phase vector and corresponding rotor position with reference to FIG. 5. The inductance of each of the other three-phase vectors is equal to its counterpart three-phase vector 180° away. That is, $L_{eqAbc} = L_{eqaBC}$; $L_{egABc} = L_{eqabC}$; and $L_{eqAbC} = L_{egaBc}$. In FIG. 6, $L_{eqAbc}$, $L_{eqABc}$ and $L_{eqAbC}$ are identified by reference numerals 602, 604 and 606, respectively.

Figure 7A:
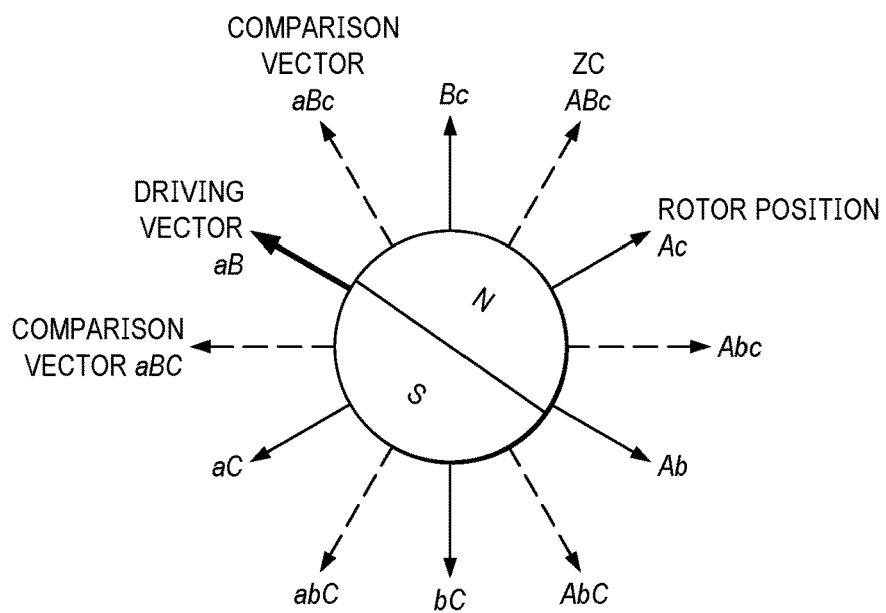
FIG. 7A is a diagram showing an example first pair of three-phase comparison vectors and corresponding driving vector current applied to drive an electric motor.
Figure 7B:
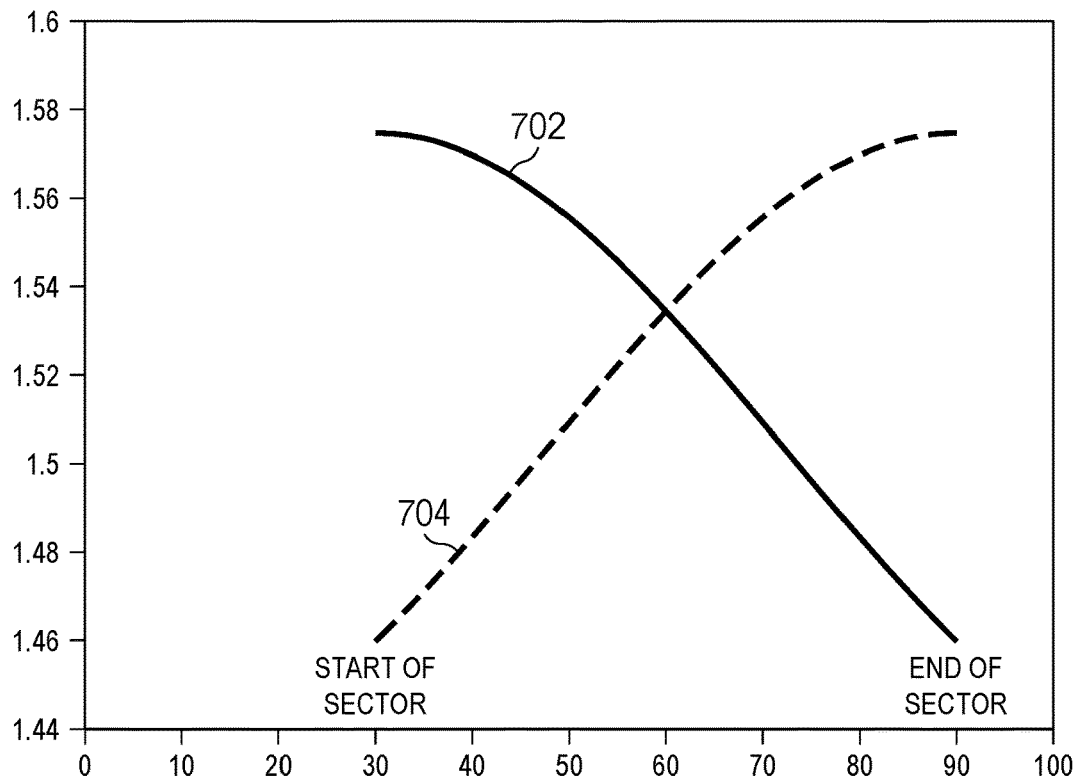
FIG. 7B is a graph of the mutual inductances resulting from application of the three-phase comparison vectors and driving vector current of FIG. 7A in a particular sector in which the electric motor is driven.

FIG. 7A is a diagram showing an example of using a driving vector and a first pair of three-phase comparison vectors (aBc and aBC) to drive motor 102/304, and in the process, detect a first ZC location in a first sector (e.g., 30°-90°). FIG. 7B is a graph 700 of the mutual inductances of these three-phase comparison vectors within the first sector. Curve 702 represents the mutual inductance of aBc ($L_{eqaBc}$) with respect to rotor angle, and curve 704 represents the mutual inductance of aBC ($L_{eqaBC}$) with respect to rotor angle.

In this example, when rotor 208 is at an initial angle of 30°, three-phase comparison vectors aBc and aBC are applied alternately to drive motor 102/304 while maintaining rated current in phase aB, which is the conventional driving vector in trapezoidal commutation for the position of rotor 208. The two three-phase comparison vectors used here are selected based on the position of rotor 208. Low magnitude pulses are alternately applied to the two three-phase comparison vectors; pulses of one polarity are applied to one such vector and pulses of the opposite polarity are applied to the other such vector, thus applying increasing current to one of two three-phase comparison vectors and applying decreasing current to the other. Applying such pulses and maintaining rated current in the conventional driving phase ensures that motor 102/304 is driven with full torque.

The mutual inductances of these two three-phase vectors are monitored and compared as rotor 208 rotates, and when the comparison indicates that their mutual inductances are approximately equal, rotor position at that equality point is determined to be the ZC location in the 30°-90° sector.

In the present example, there are six possible three-phase vectors, and their resulting mutual inductances are given by the equations below.

$$L_{eqAbc} = L_{eqaBC} = \left(\frac{3}{2}\right)\frac{L_0^2 - L_1^2}{2L_0 - L_1(2\theta_r)}.$$

$$L_{eqABc} = L_{eqabC} = \left(\frac{3}{2}\right)\frac{L_0^2 - L_1^2}{2L_0 - L_1\cos\left(2\theta_r - \frac{2\pi}{3}\right)}.$$

$$L_{eqAbC} = L_{eqaBc} = \left(\frac{3}{2}\right)\frac{L_0^2 - L_1^2}{2L_0 - L_1\cos\left(2\theta_r + \frac{2\pi}{3}\right)}.$$

$L_{egaBc} = L_{eqaBC}$ once in the 30°-90° sector, and from the above equations and as shown in FIG. 7B, when rotor 208 is at $$\frac{\theta}{3}$$

(i.e., the 60° ABc position). So, once rotor 208 moves to ABc where the mutual inductances of the applied three-phase vectors are equal, ABc is considered the BEMF ZC location. In this way, the BEMF ZC location is detected for 30°-90° sector, and the same process may be applied to detect the BEMF ZC for each sector.

Figure 8A:
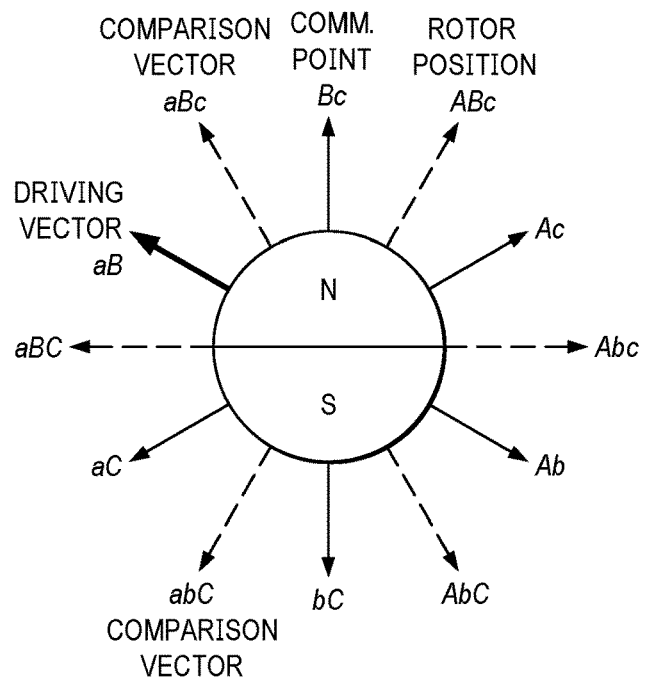
FIG. 8A is a diagram showing an example second pair of three-phase comparison vectors and corresponding driving vector applied to continue to drive the electric motor.
Figure 8B:
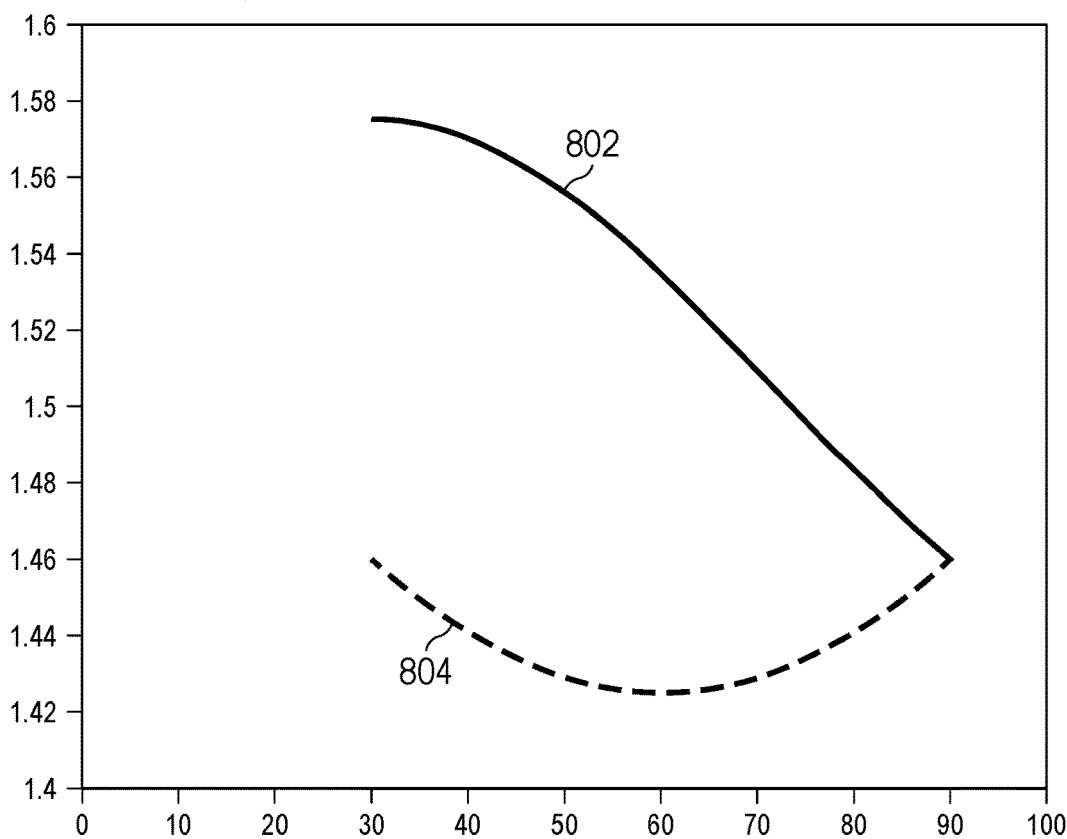
FIG. 8B is a graph of the mutual inductances resulting from application of the three-phase comparison vectors and driving vector current of FIG. 8A in the sector.

FIG. 8A is a diagram showing an example of using a second pair of three-phase comparison vectors (aBc and abC) to continue to drive motor 102/304, and in the process, detect a first commutation point in a first sector (e.g., 30°-90°). FIG. 8B is a graph 800 of the mutual inductances of these three-phase vectors within the first sector. Curve 802 represents the mutual inductance of aBc ($L_{eqaBc}$) with respect to rotor angle, and curve 804 represents the mutual inductance of aBC ($L_{eqaBC}$) with respect to rotor angle.

To detect the commutation point in the 30°-90° sector, with rotor 208 at ABc, three-phase comparison vectors aBc and abC are applied alternately to drive motor 102/304 while maintaining rated current in phase aB, which is the conventional driving vector in trapezoidal commutation for this position of rotor 208. The two three-phase comparison vectors used here are selected based on the position of rotor 208. Low magnitude pulses are alternately applied to the two three-phase comparison vectors; pulses of one polarity are applied to one such vector and pulses of the opposite polarity are applied to the other such vector. Applying such pulses and maintaining rated current in the conventional driving phase ensures that motor 102/304 is driven with full torque.

The mutual inductances of these two three-phase vectors are monitored and compared as rotor 208 continues to rotate, and when the comparison indicates that their mutual inductances are approximately equal, rotor position at that equality point is determined to be the commutation point in the 30°-90° sector.

From the above equations and as shown in FIG. 8B, $L_{egaBc} = L_{eqabC}$ once in the 30°-90° sector, which is when rotor 208 is at $$\frac{\theta}{2}$$

(i.e., the 90° Bc position). So, once rotor 208 moves to Bc where the mutual inductances of the applied three-phase vectors are equal, Bc is considered the commutation point for this sector. In this way, the commutation point is detected for 30°-90° sector, and the same process may be applied to detect the commutation for each sector.

FIG. 9A is a table showing, for each 30° span (Actual Rotor Angle), the driving vector in trapezoidal commutation for which rated current is maintained (Applied Trap Vector), the two three-phase comparison vectors applied (New Vectors for MI based position Detection), the detected angle, and what the detected angle represents (ZC location or commutation point). The first two 30° spans represent one sector, the next two 30° spans represents the next sector, and so on. Thus, there are six (6) sectors, as indicated on the diagram of FIG. 9B.

As can be seen from the table of FIG. 9A, for each sector, two pairs of three-phase vectors are applied for a single driving vector. From application of the first pair of three-phase vectors, the ZC location for that sector is detected, and from application of the second pair of three-phase vectors, the commutation point for that sector is detected.

Figure 10:
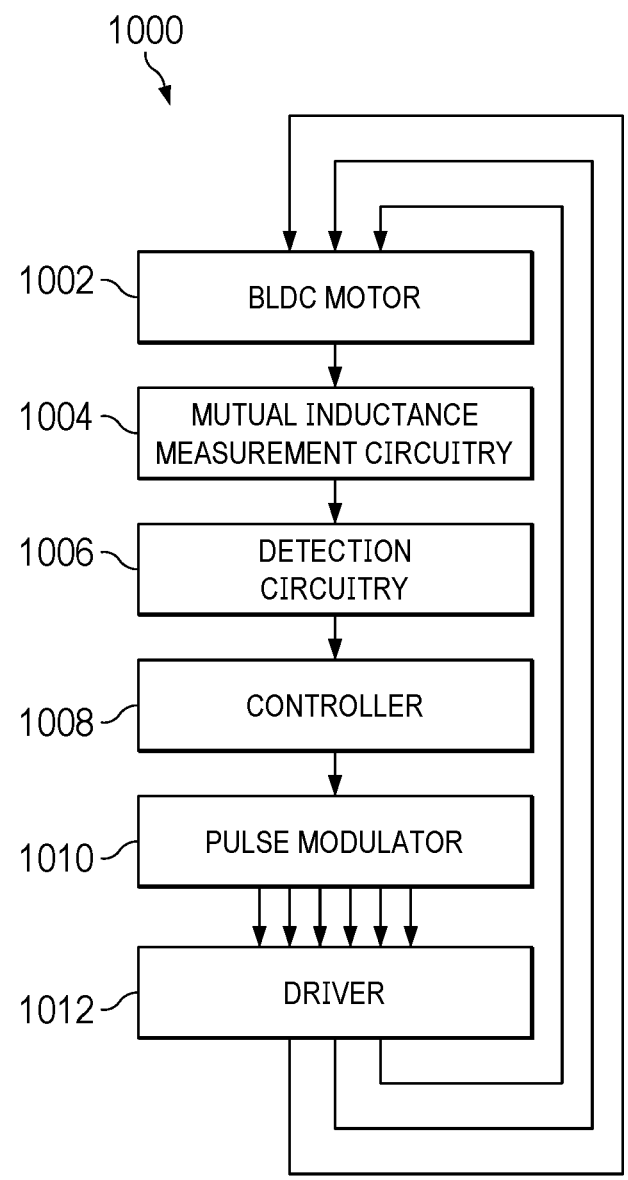
FIG. 10 is a block diagram illustrating example components of, and process flow in, an example electric BLDC motor system for detecting ZC locations and commutation points using three-phase vectors.

FIG. 10 is a block diagram illustrating example components of, and process flow in, an example electric BLDC motor system for detecting ZC locations and estimating commutation points using three-phase vectors. During operation, e.g., open-loop start-up, the phase voltages, e.g., $V_A$, $V_B$ and $V_C$, as well as the corresponding phase currents, of BLDC motor 1002 (which may correspond to motor 102/304) are sampled, and from such sampling, mutual inductances are measured and compared using mutual inductance measurement circuitry 1004 (e.g., embodied in measurement logic 104). Detection circuitry 1006 is coupled to circuitry 1004 to compare mutual inductances resulting from application of pairs of three-phase vectors, and based on the comparisons detect ZC locations and commutation points. To this end, detection circuitry 1006 may include comparators, analog-to-digital converters (ADCs) and/or other suitable circuitry for making comparisons and outputting a detection signal when comparison of two mutual inductances indicates that they are approximately equal. For each sector, two pairs of three-phase vectors are applied, while supplying current in the drive phase. A ZC location for that sector is detected based on the first pair of three-phase vectors, and a commutation point for that sector is detected based on the second pair of three-phase vectors. A controller 1008 coupled to detection circuitry 1006 receives the detected ZC locations and commutation points. Based on this information, controller 1008 controls pulse modulator 1010, which controls modulation of phase currents and phase voltages of BLDC motor 1002. Embedded in this control, which is transmitted to driver 1012, is a next pair of three-phase vectors to be applied after each ZC and commutation point determination and a next driving vector to apply after commutation point determination.

Figure 11:
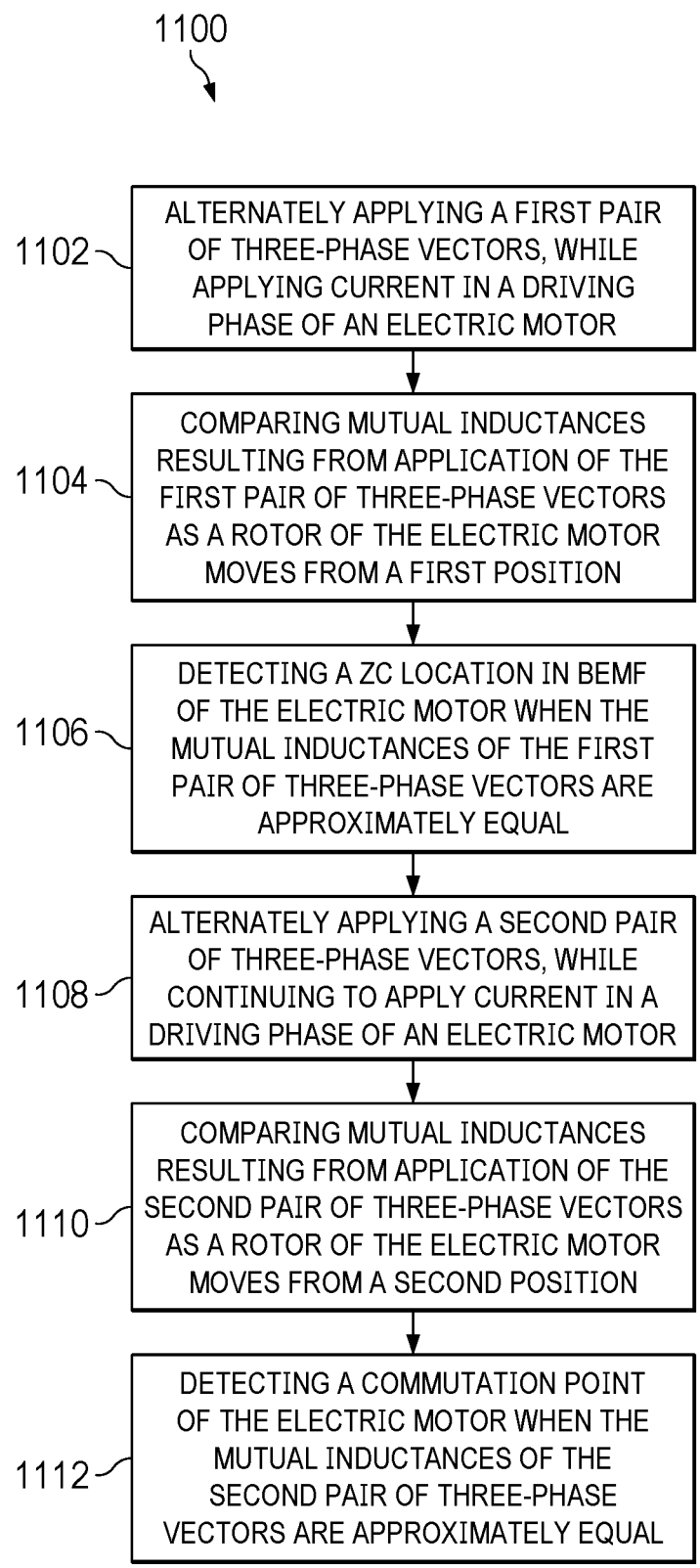
FIG. 11 is a flow diagram illustrating an example of operating an electric motor at start-up or at low-speed to detect ZC locations and commutation points using three-phase vectors.

FIG. 11 is a flow diagram of an example method 1100 of operating an electric motor, e.g., a three-phase, electric BLDC motor at start-up or other low speed condition. In operation 1102, a first pair of three-phase vectors are alternately applied to the electric BLDC motor, while current (e.g., rated current) is applied for the standard trapezoidal driving phase for the position of the rotor. In operation 1104, the mutual inductances resulting from application of the first pair of three-phase vectors are then monitored and compared as the rotor moves. When the mutual inductances from the first pair of three-phase vectors are approximately equal, the position of the rotor at that equality point is deemed to be a ZC location (operation 1106). A second pair of three-phase vectors are then applied, while maintaining current in the driving phase, in operation 1108. The mutual inductances resulting from application of this second pair of three-phase vectors are monitored and compared in operation 1110 as the rotor continues to move. When the mutual inductances of the second pair of three-phase vectors are approximately equal, the position of the rotor at that equality point is deemed to be a commutation point (operation 1112).

The process described in connection with FIG. 11 is for one sector. Thus, the process may continue for each successive sector as the rotor continues to move. Each sector has a different driving vector based on the current position of the rotor.

FIG. 11 depicts one possible order of operations. Not all operations need necessarily be performed in the order described. Some operations may be combined into a single operation. Additional operations may be performed as well.

Employing example motor control systems and methods described herein improve start-up and low-speed motor operation. Such systems and methods employ a three-phase inductance-based technique, along with maintaining a non-zero driving current (e.g., maintaining rated current) for the driving phase, to reliably and accurately detect ZC locations and commutation points without comprising torque during low-speed operation. Moreover, detection of ZC locations from inductance provides a smooth and reliable transition to BEMF-based ZC operation at high speed. Example arrangements provide performance characteristics equivalent to sensor-based electric motor systems but without the added cost and maintenance requirements.

The term "coupled" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to provide functionality at least partially similar to functionality available prior to the component replacement.

Uses of the phrase "ground" in the foregoing description includes any suitable ground. Unless otherwise stated, "about," "approximately," or "substantially" preceding a value means +/−10 percent of the stated value.

Modifications of the described examples are possible, as are other examples, within the scope of the claims. Moreover, features described herein may be applied in other environments and applications consist with the teachings provided.

What is claimed is:

1. A process of operating an electric motor, comprising:
    alternately applying first and second three-phase vectors to move a rotor of the electric motor from a first position, the first three-phase vector being a first angular degree from the first position of the rotor and the second three-phase vector being a second angular degree from the first position of the rotor;
    delivering a current in a driving phase of the electric motor;
    comparing mutual inductances resulting from application of the first and second three-phase vectors as the rotor moves from the first position; and
    detecting a zero-crossing (ZC) location in back-electromotive force (BEMF) of the electric motor based on the comparing of the mutual inductances of the first and second three-phase vectors.

2. The process of claim 1, wherein the first three-phase vector is approximately 90 electrical degrees in a first rotational direction from the first position of the rotor, the second three-phase vector is approximately 150 electrical degrees in the first rotational direction from the first position of the rotor, and the driving phase is approximately 120 electrical degrees from the first position of the rotor.

3. The process of claim 2, further comprising:
    alternately applying third and fourth three-phase vectors to move the rotor from a second position, the third three-phase vector being a third angular degree in the first rotational direction from the second position of the rotor and the fourth three-phase vector being a fourth angular degree in the second rotational direction from the second position of the rotor;
    comparing mutual inductances resulting from application of the third and fourth three-phase vectors as the rotor moves from the second position; and
    detecting a commutation point of the electric motor based on the comparing of the mutual inductances of the third and fourth three-phase vectors.

4. The process of claim 3, wherein the third three-phase vector is approximately 60 electrical degrees in the first rotational direction from the second position of the rotor, the second three-phase vector is approximately 180 electrical degrees in the first rotational direction from the second position of the rotor, and the driving phase is approximately 90 electrical degrees from the second position of the rotor.

5. The process of claim 3, wherein the rotor is driven in an angular sector of a full rotation of the electric motor in response to the application of the first, second, third and fourth three-phase vectors.

6. The process of claim 3, further comprising:
    changing the driving phase of the electric motor after detecting the commutation point.

7. The process of claim 6, wherein the changing of the driving phase of the electric motor includes alternately applying fifth and sixth three-phase vectors.

8. The process of claim 1, wherein the current is delivered in the driving phase at values greater than zero.

9. The process of claim 5, wherein the current delivered in the driving phase is maintained at an average of the rated current for the electric motor.

10. A process of operating an electric motor, comprising:
alternately applying a first set of three-phase vectors for a first driving phase to detect a first zero-crossing (ZC) location in back-electromotive force (BEMF) of the electric motor in a first angular sector of a rotor of the electric motor; and
alternately applying a second set of three-phase vectors for the first driving phase to detect a first commutation point of the electric motor in the first angular sector.

11. The process of claim 10, further comprising:
alternately applying a third set of three-phase vectors for a second driving phase to detect a second zero-crossing (ZC) location in back-electromotive force (BEMF) of the electric motor in a second angular sector of the rotor; and
alternately applying a fourth set of three-phase vectors for the second driving phase to detect a second commutation point of the electric motor in the second angular sector.

12. The process of claim 11, wherein a first three-phase vector of the first set is the same as a first three-phase vector of the second set.

13. The process of claim 12, wherein a second three-phase vector of the second set is the same as a second three-phase vector of the third set.

14. A system comprising:
an electric motor having a rotor;
a driver configured to apply two three-phase vectors to the electric motor and supply driving phase current;
measurement logic configured to measure mutual inductances resulting from application of the two three-phase vectors;
detection logic coupled to the measurement logic and configured to detect a zero-crossing (ZC) location in back-electromotive force (BEMF) of the electric motor based on a comparison of the measured mutual inductances of the two applied three-phase vectors; and
control logic coupled to the detection logic and configured to control the driver based on information received from the detection logic.

15. The system of claim 14, wherein the driver is configured to apply the two three-phase vectors alternately.

16. The system of claim 14, wherein the driver is configured to control the electric motor to deliver a driving phase current at an average of the rated current for the electric motor.

17. The system of claim 14, wherein:
the driver is configured to apply another two three-phase vectors to the electric motor and continue to supply the driving phase current;
the measurement logic is configured to measure mutual inductances resulting from application of the another two three-phase vectors applied to the electric motor; and
the detection logic is configured to detect a commutation point of the electric motor based on a comparison of the measured mutual inductances of the another two three-phase vectors.

18. The system of claim 17, wherein the driver is configured to apply the another two three-phase vectors alternately.

19. The system of claim 14, wherein the driver is configured to control the electric motor to maintain the driving phase current at values greater than zero.

* * * * *